INVENTOR.
F.A. Allner
BY
ATTORNEY.

March 20, 1934.  F. A. ALLNER  1,951,640
DUAL USE HYDRAULIC MACHINE
Original Filed Nov. 30, 1929   10 Sheets-Sheet 2

FIG. 6
◄ DIRECTION OF ROTATION

FIG. 7

FIG. 8
DIRECTION OF ROTATION ►

INVENTOR.
F. A. Allner
BY
ATTORNEY.

INVENTOR.
F. A. Allner
BY
Thomas W. J. Clark
ATTORNEY.

March 20, 1934.　　　F. A. ALLNER　　　1,951,640
DUAL USE HYDRAULIC MACHINE
Original Filed Nov. 30, 1929　　10 Sheets-Sheet 8

Fig. 18

INVENTOR.
F.A.Allner
BY
ATTORNEY.

March 20, 1934.  F. A. ALLNER  1,951,640
DUAL USE HYDRAULIC MACHINE
Original Filed Nov. 30, 1929  10 Sheets-Sheet 9

Fig. 19.

INVENTOR.
F.A. Allner
BY
ATTORNEY.

Fig. 20.

Patented Mar. 20, 1934

1,951,640

UNITED STATES PATENT OFFICE 1,951,640

DUAL USE HYDRAULIC MACHINE

Frederick A. Allner, Baltimore, Md.

Original application November 30, 1929, Serial No. 410,818. Divided and this application July 3, 1931, Serial No. 548,684

14 Claims. (Cl. 253—148)

This application is a division of my Patent Number 1,813,107, dated July 7, 1931, in which is shown a "Method of and means for increasing the useful low flow capacity of a hydro-electric plant."

Heretofore it had been considered essential in all cases where low cost off-peak energy had been converted by means of hydraulic storage into high value peak energy, to employ special pumps for lifting the water (as distinguished from the turbines for using the water). This invention will make it unnecessary to employ specially built pumping sets as the equivalent function can be performed by suitably designed dual use hydraulic machines as will be further described in the disclosure. It is not possible to operate at quite as high an efficiency when pumping with such dual use hydraulic machines which are primarily designed for efficient and large capacity generation as turbines, as in the case of those storage plants where specially designed pumps are employed, that are not used as turbines.

High efficiency of pumping is essential in specially designed storage works because the pumping and generating cycle is repeated nearly every day, or at least during a large portion of the year. In the case of a run-of-river development with widely fluctuating stream flow, to which this invention is primarily applicable, pumping is necessary only a small portion of the time and high pumping efficiency is not as essential as in those other specially designed, more or less regularly functioning pumped storage plants. As this invention contemplates the use of dual purpose hydraulic machines at only slight additional expense over the cost of single purpose generating units and with only a nominal, if any, increase in the cost of hydraulic structure, and without any cost whatever for specially constructed reservoirs, the gain in useful capacity will be practically all net gain.

Rather than strive for hydraulic machines that will be very efficient for pumping, but will have low capacity and efficiency when generating, I endeavored to develop several types of dual use hydraulic machines which have practically the same efficiency and capacity, when operating as a turbine, as the best types of modern turbines on the market, but which will be so designed that they will assuredly pump at a moderately reduced efficiency over the whole range of heads against which they have to lift water during the pumping period.

Other objects and advantages will become apparent from the specification, taken in connection with the accompanying drawings, wherein the invention is embodied in concrete form.

For the past several years I have made experiments with several types of pumps operating as turbines, and with several types of turbines operating as pumps against the same heads over a wide range of speed and discharge. In so far as I have been able to find out neither the Francis nor other types of turbines have ever been operated as dual use machines. I have also not been able to find any record of centrifugal pumps ever having been operated as turbines and their characteristics determined over a wide range of head and speed. I consider it, therefore, of importance to include in this disclosure an outline of the various test results with a proper theoretical interpretation of the peculiar characteristics observed during these experiments.

Figure 1:
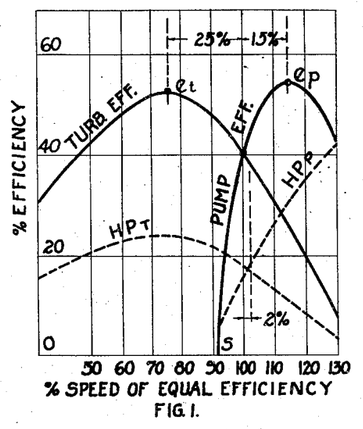
Fig. 1 shows in curve form efficiency and capacity of a six stage high head pump of low efficiency, functioning either as turbine or as pump over a wide range of speed, operating under a constant head.
Figure 2:
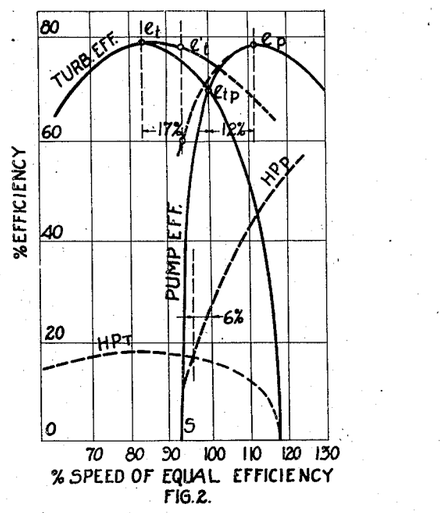
Fig. 2 shows in curve form efficiency and capacity of a single stage Francis type low head pump, of medium efficiency, functioning either as turbine or as pump over a wide range of speed, operating under a constant head.

One of the fundamental discoveries in the course of these experiments was that a centrifugal pump, no matter how low its efficiency due to friction, shock losses, leakage, etc. will give practically the same efficiency when operating under the same head as a turbine as when operating as a pump, but at reduced speed and output. Fig. 1 shows the results of tests on a six stage centrifugal pump when operated under the same static or gross head, $H_s$, as a pump and as a turbine, both over a wide range of speed. Fig. 2 shows similar curves for a single stage, more efficient pump of the Francis type. It will be evident from these curves that the higher the efficiency for which the hydraulic machine is primarily designed, the closer together will be the speeds of best pump and best turbine efficiency under the same static head.

As practically all losses in a hydraulic machine are proportionate to the square of water velocity or directly proportional to the head, I can express, neglecting the effect of leakage, the work of the unit quantity of water in a turbine operating under the static head $H_s$ and at an efficiency $e_t$ as being proportional to $e_t$ times $H_s$. This value represents the useful net head $H_t$ of the turbine, the difference between $H_s$ and $H_t$ being the head loss in the turbine. The same machine, when operated as a pump at an efficiency $e_p$, must produce in its runner an effective pumping head $H_p$ equal to the static head $H_s$ plus losses $$\left(H_p = \frac{H_s}{e_p}\right).$$

The flow of water through the stationary and rotating passages of hydraulic machines, operating either as pump or as turbine, is governed by the same hydraulic laws provided that these passages are so designed that there are only gradual changes in cross-section of passages favoring continuity of stream lines.

Such theoretically perfect conformity of velocity and pressure relations can rarely be reached even if the effect of friction and leakage could be neglected, but its nearest approach will occur approximately at that speed at which the hydraulic machine shows its best efficiency. I can express the approximate relation between the speeds of best pumping efficiency ($N_p$ at efficiency $e_p$) and of best turbine efficiency ($N_t$ at efficiency $e_p$) by the equation $$N_p = \frac{N_t}{\sqrt{e_t e_p}},$$

developed as follows: Since $N_p$ will be proportionate to square root of $H_p$ and $N_t$ proportionate to square root of $H_t$, I can write $$N_p : N_t = \sqrt{H_p} : \sqrt{H_t}$$

or $$\sqrt{\frac{H_s}{e_p}} : \sqrt{H_s e_t}$$

I can write then:

$$N_p = \frac{N_t}{\sqrt{e_p e_t}},$$

independent of static hand $H_s$.

For conditions of perfect reversibility of flow, turbine efficiency and pump efficiency are identical and the best speeds for the two operations will be directly proportional to efficiency. For example a pump performing at 90% efficiency against a static head of 100 feet at 100 rev. per min., may be expected to operate as turbine under the same head at the efficiency of 90% when its speed is reduced to 90 rev. per min. Such variations in speed cannot be readily arranged for without appreciable increase in investment cost for variable ratio gearing or special electrical equipment, involving also a loss in efficiency. Except for special applications referred to later, we must endeavor to strike the best practical compromise of single speed operation for both purposes.

In the above described case of a pump having 90% efficiency at 100 rev. per min., we may select any speed between 90 rev. per min. and 100 rev. per min. for this compromise speed, provided that the hydraulic motor will assuredly pump even at 90 rev. per min.

There will be an intermediate speed at which the hydraulic motor functions with equal efficiency either as pump or as turbine, this speed of equal efficiency being used as 100% of the speed scale on Figs. 1 and 2, the efficiency itself being entered as point $e_{tp}$.

The centrifugal pump of the Francis type for which the characteristic curves of Fig. 2 are drawn, has the same best efficiency of approximately 77% for both operations, best pump speed ($e_p$) being 12% above and best turbine speed ($e_t$) 17% below the speed of equal efficiency ($e_{tp}$) of approximately 69%. At best pump speed, turbine efficiency drops to about 58% of $e_t$, reduction of capacity being of approximately the same order. At speed of equal efficiency, $e_{tp}$ appears approximately 10% lower than at best points, capacity of pumping and generation being reduced by a similar percentage. At best turbine speed, however, this type of hydraulic machine, which had only a spiral casing but no guide vanes, will not be able to pump at all, regardless of efficiency, because the speed of impending delivery lies approximately half way between $e_t$ and $e_{tp}$.

The efficiency and power curves of Fig. 2 would show different characteristics if the casing of this pump were equipped with movable guide vanes of the type customary with reaction turbines. The curve of turbine efficiency would be less drooping for speeds above $e_t$, and the curve for pump efficiency for speeds lower than $e_p$ would not drop off as abruptly. The two curves would follow approximately the dotted lines shown in Fig. 2 with the result that at a speed only slightly higher than best turbine efficiency $e_t$, the same rotor could function as a turbine at greater capacity and only slightly reduced efficiency $e_t'$, and could operate as a pump at an efficiency of approximately 60%.

The above can be better illustrated by an analysis of the changes in the velocity diagrams at entrance and exit caused by the presence of adjustable guide vanes. The fundamental equations that must be satisfied are homologous for turbine and pump, the coefficient of efficiency appearing on the right side of the equation as multiplier of the static head ($H_s$) and acceleration due to gravity ($g$) in the turbine formula and as a divisor in the pump formula, viz:

For turbine $u_1 c_{u1} - u_2 c_{u2} = g.H_s.e_t$.

For pump $u_2 c_{u2} - u_1 c_{u1} = \dfrac{g.H_s}{e_p}$

Figure 6:
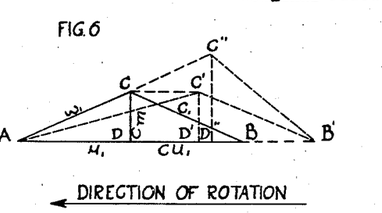
Fig. 6 is a group of velocity diagrams at entrance when the centrifugal pump of the characteristics shown in Fig. 2 is operated as turbine with and without movable guide vanes.
Figure 7:
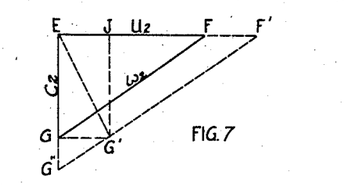
Fig. 7 is a group of velocity diagrams at exit when the centrifugal pump of the characteristics shown in Fig. 2 is operated as turbine with and without movable guide vanes.

The customary symbols represent:

|  | Fig. 6 at entrance | Fig. 7 at exit |
|---|---|---|
| Peripheral speed | $u_1$(AB) | $u_2$(EF) |
| Absolute velocity | $c_1$(BC) | $c_2$(EG) |
| Relative velocity | $w_1$(AC) | $w_2$(FG) |
| Component of absolute velocity in direction of peripheral speed | $c_{u1}$(BD) | $c_{u2}$ |
| Component of absolute velocity at right angle to peripheral speed | $c_{m1}$(CD) | $c_{m2}$ |

For peripheral speed $u_1$ of best turbine efficiency $e_t$, the exit velocity $c_2$ will have no horizontal or whirl component $c_{u2}$ and the general equation $$u_1 c_{u1} - u_2 c_{u2} = g.e_t.H_s.$$

will become $$u_1 c_{u1} = g.e_t.H_s.$$

If we increase the speed of the hydraulic machine without adjustable guide vanes from AB to AB', the velocity diagram at entrance will have point C shifted approximately to C' and on the velocity diagram at exit, point G will shift to G' without appreciable increase in $c_{m1}$, causing a shock loss CC' at entrance and a whirl component GG' at exit, both having a tendency to lower the efficiency from $e_t$ to $e_t'$, the mutual relations of the various velocities being such that again the general turbine equation will be satisfied by the changed values, viz:

$$AB' \times B'D' - EF' \times EJ = g.e_t'.H_s.$$

If, however, the hydraulic machine is equipped with movable guide vanes, an increase in speed from AB to AB' will result in a shifting in the entrance diagram of point C to C'', lying almost in line with AC, and a shifting in the exit diagram of point G to G'', which changes will not involve an appreciable shock loss at entrance nor whirl component at exit and will therefore not cause as large a drop in efficiency from $e_t$ to $e_t''$ as formerly from $e_t$ to $e_t'$, the lowering of the efficiency being largely due to the increased friction caused by larger discharge C''D''. Again the general turbine equation must be satisfied by the changed values of velocities and efficiency, viz:

$$AB' \times B'D'' = g.e_t''.H_s.$$

The above velocity diagrams deal with turbine operation only and show that adjustable guide vanes have a tendency to increase efficiency and capacity beyond those observed without guide vanes over the speed range between $e_t$ and $e_p$. Similarly, it can be shown that adjustable guide vanes would improve pump operation in the range of speed just below $e_p$, as indicated by the dotted line of Fig. 2.

The suitability for dual use of a hydraulic rotary machine of the characteristics as depicted in Fig. 2, could be still further enhanced if it were equipped not only with adjustable guide vanes, but also with adjustable rotor blades. The turbine efficiency curve between $e_t$ and $e_p$ would be flattened out still more than shown by the dotted curve in Fig. 2 and the points on the pump efficiency curve to the left of $e_p$ would appear at lower speeds than shown by the dotted curve.

Figure 3:
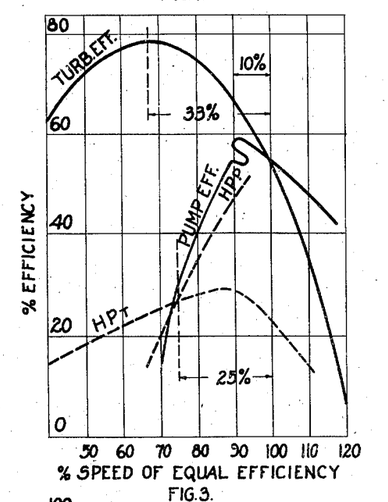
Fig. 3 shows in curve form efficiency and capacity of a medium head Francis type turbine, functioning either as a turbine or as pump over a wide range of speed, operating under a constant head.

When operating Francis type turbines as pumps we cannot expect the same degree of reversibility of flow and head relations as when operating pumps as turbines, unless special precautions are taken in the design of these turbines to make them adaptable for dual use. It is a well known fact that it is easier to convert pressure into velocity without shock, which is the chief function of a turbine, than to convert velocity into pressure with a minimum of shock, as must be accomplished in a properly designed pump. Considerably more attention must therefore be given to the rate of diffusion and the elimination of shock losses when designing a pump. Fig. 3 shows in curve form the efficiency and capacity in relation to speed as obtained from model tests on a modern high specific speed Francis runner operating as turbine and as pump. The relationship of speed at best pump efficiency to speed at best turbine efficiency remains the same as developed for the hydraulic rotary machines, originally designed as pumps:

$$N_p = \dfrac{N_t}{\sqrt{e_t e_p}}$$

Fig. 3 gives values obtained from several hundred pump and turbine tests on a runner model having maximum turbine efficiency of 78%. This model was an exact small scale reproduction of a 20,000 hp. turbine on which it was not practical to carry through field tests over the same wide range of speeds and power. The full size turbine, however, had an efficiency slightly in excess of 92%.

The outstanding characteristics of the pump efficiency curve are that even at best speed the efficiency is appreciably lower than best turbine efficiency and that there is a lack of continuity at a speed just below that of best efficiency. These peculiarities can be better illustrated by following up the behavior of the pumping turbine at certain definite positions of the movable guide vanes rather than by a discussion of the efficiency curve of Fig. 3 which is an envelope curve over a large number of tests at different gate openings.

Figure 4:
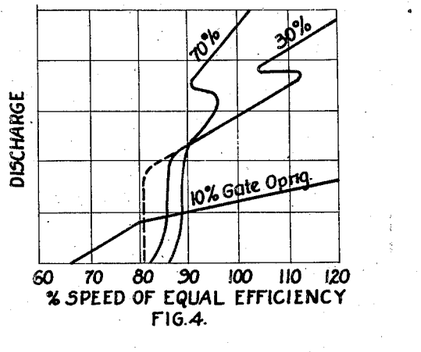
Fig. 4 shows in curve form relation of speed and discharge for a turbine of the characteristics shown in Fig. 3, when operated as pump at 10%, 30% and 70% gate opening.

Fig. 4 shows the relation between speed and discharge with guide vanes locked in three positions, 10%, 30% and 70%. The point of discontinuity of flow is passed for the higher gate openings at lower speeds than for the lower gate openings. For the lowest gate opening of 10% this point of discontinuity would occur at a higher speed than shown on the scale.

A study of the physical dimensions of the Francis runner brought out the fact that the area measured at right angles to the stream flow through the runner vanes increased very rapidly from the inflow end to the discharge end (when operating as a pump), the discharge area being of the order of 150 percent of the inflow area. This increase of area will result in very rapid diffusion of the water flowing through the runner, and it is a well known fact that when water is diffused too rapidly the stream lines will be broken up and serious eddying with its accompanying losses and danger of cavitation will result. The discontinuity of the pump efficiency curves can be directly attributed to this phenomenon, the discontinuity occurring at the speed where the stream line flow is broken up.

Figure 5:
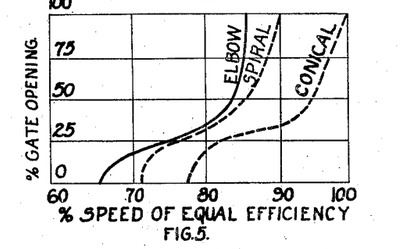
Fig. 5 shows relation between gate opening and speed of impending delivery for a turbine of the characteristics shown in Fig. 3, when operated as pump either with a short elbow intake or with a spiral or with a long conical intake.

It will be noted from Fig. 4 that the speed of impending delivery varies with the position of the guide vanes, the lowest speed occurring at minimum gate opening. Over the whole range of possible gate openings the speed of impending delivery varies quite appreciably, the total range under the conditions for which the test curves of Fig. 4 were obtained being approximately 30% of the minimum speed of impending delivery. Test results of Fig. 4 refer to a model set-up with complete spiral casing and with a short elbow type draft tube. Similar tests were also made with other types of draft tubes (a long conical tube and a spiral type draft tube) and without spiral casing on the intake side. Relation of speed of impending delivery to gate opening for the three types of draft tubes (but all with spiral casing on the intake side), is shown in Fig. 5.

The spiral type tube, because of the high tangential velocity component present at inflow, requires a higher speed to start pumping, and the long conical tube, probably due to larger mass of water to be started and greater friction losses, requires a still higher speed. The speeds of best pumping efficiencies also vary for the different kinds of draft tubes, the lowest speed, though not the best efficiency, occurring with the short elbow tube. For single speed operation of dual use hydraulic machines, lowest practical speed of impending delivery is essential. For those dual use machines where a higher speed can be employed for pumping than for turbine operation, this condition may be waived in favor of higher efficiency when pumping at the higher speed.

On Fig. 4, for the discharge curve at 30% gate opening, a dotted line has been drawn in near speed of impending delivery. This is indicative of a typical condition found in practically all tests at various gate openings. It requires a greater speed to begin pumping than to continue pumping once the flow is started, even though the water passages are filled with water at all times. The full line curve of quantity versus speed for 30% gate opening in Fig. 4 was obtained for increasing speeds, whereas the dotted line was obtained for decreasing speeds, resembling the well known magnetic hysteresis loop of iron. If the speed of the pump were gradually increased, starting just below the speed of impending delivery, the flow would increase very slowly at first and then more rapidly, to a point about 10% above the speed of impending delivery. By reversing the procedure and gradually decreasing the speed, the flow would remain nearly constant down to the speed of impending delivery, at which speed the flow would suddenly drop to zero.

As mentioned above, this characteristic condition was observed for practically all guide vane openings and for different types of draft tubes. This action may be explained by the fact that for water passages that have a substantial difference of radii in a cross-section at right angles to the stream line, outward flow, i. e., pumping, will start first on that portion of the cross-section where the radius is greatest. In those portions of the cross-section where the radius is smaller, there will not be an outward flow but probably an inward flow sustained by the pumping action of the larger radius sections.

This will have a tendency to maintain a circulating flow within the water passages of the runner, the area of which circulation will be gradually reduced as the pumping pressure of the outer radius sections will increase. Eventually the circulating area of the inner section will be entirely eliminated at the higher speeds, although the pumping work done, or the discharge per square inch of cross-sectional area will always have a tendency to be greater on the outside than on the inside. If we lower the speed from a value at which pumping action had been observed over the whole cross-sectional area, the transition of the outward or pumping flow to a partly pumping and partly circulating flow will occur at a lower speed than transition of partly pumping and partly circulating flow to all outward or pumping flow, when gradually increasing speed. This phenomenon is of some importance when developing dual use machines from those types of turbine runners where there is a relatively large difference in radius in the cross-sectional area at right angles to the stream lines. One should endeavor then to design the inner area for slightly larger diffusion so as to produce there greater pressure, which will have a tendency to counteract the circulation from the outer areas, without however exceeding the permissible rate of diffusion for the velocities prevailing in the inner radii sections.

The speed of impending delivery can be lowered, the circulation of water in the runner passages can be further reduced, and more uniform flow over the whole cross-section of the water passage can be established at a lower speed, if not only the stationary guide vanes but also the blades of the rotor are made adjustable for different angular positions, so that the angles of the blades to the periphery at the points of entrance and exit as well as the cross-sectional areas of the water passages can be reduced. The effect of smaller guide vane angles and of smaller blade angles on the lowering of the speed of impending delivery as observed during the experiments, can also be shown by an analysis of the velocity diagrams, as indicated in Figs. 8 and 9.

We will assume that at a speed only slightly above that of impending delivery, a very small amount of water is discharged, the radial component of which is $dc_m$. We may regard this small quantity of water, corresponding to the radial discharge velocity $dc_m$ to be just sufficient to be measurable.

Figure 8:
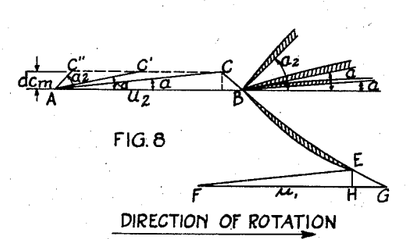
Fig. 8 shows velocity diagrams at entrance and exit for a turbine with movable guide vanes, when operated as pump near speed of impending delivery.
Figure 9:
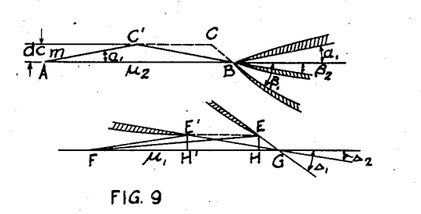
Fig. 9 shows velocity diagrams at entrance and exit for a turbine with adjustable rotor blades, when operated as pump near speed of impending delivery.

Fig. 8 gives the velocity diagrams at the inflow and outflow edges of a turbine, operating as a pump. When this small quantity of water $dc_m$ is being pumped, two positions of the guide vanes, $\alpha_1$ and $\alpha_2$ are assumed, the smaller angle $\alpha_1$ representing the guide vanes in almost closed positions. For shockless exit, a still lower angle of the guide vanes, $\alpha$, would be required in order to complete at a peripheral speed $u_2$ the velocity diagram ABC.

It may be seen from the general pump equation $$U_2 c_{u2} - u_1 c_{u1} = \frac{g \cdot H}{e},$$

that for an assumed discharge $dc_m$, a higher hydraulic efficiency will permit lower peripheral speeds $u_2$ and $u_1$. The exit velocity triangle of Fig. 8 shows the shock loss for the angular position of the guide vanes corresponding to $\alpha_1$ to be proportional to the square of CC', and for the angular position $\alpha_2$ a loss in efficiency proportional to the square of CC''. It is therefore evident that the exit shock losses increase with increased vane angle, the greater vane angle therefore requiring a greater value of $u_2$ to pump $dc_m$ which, as mentioned above, is the first increment of flow at a speed nearly equal to that for impending delivery. An inherent effect of this increased $u_2$ required for larger vane angles is its effect on the whirl component at inflow, shown on the inflow diagrams of Fig. 8. An increase in the peripheral speed $u_1$ will increase $c_{u1(FH)}$, the whirl component of the entrance velocity, thereby requiring a still greater increase in $u_2$. We may therefore expect that, due to the direct effect of shock loss and the indirect effect of increased whirl component at higher speed, the speed of impending delivery will show a relatively large increase as the angles of the stationary guide vanes to the periphery become greater.

In the velocity diagrams of Fig. 9 it will be shown that a similar relation exists between speed of impending delivery and angular position of adjustable rotor blades, assuming that the stationary guide vanes remain in the same position. In the exit diagram $\beta_1$ represents the larger angle and $\beta_2$ the smaller angle of the rotor blades to the tangent, $\alpha_1$ being the smallest practical angle of the guide vanes at speed of impending delivery. Similarly, I have shown at the point of inflow the velocity diagram EFG for the more open position of rotor blades corresponding to angle $\Delta_1$, and velocity diagram E'FG corresponding to a smaller angle of rotor blades $\Delta_2$. The whirl component FH at entrance for angle $\Delta_1$ is reduced to a smaller value FH' for angle $\Delta_2$, which has the effect of reducing the subtrahend $u_1 c_{u1}$ in the general turbine equation. We have again the same two-fold effect, i. e., the reduction of shock losses for the smaller angles of rotor blades at exit will improve the efficiency and thereby lower the factor $$\frac{H}{e}$$

on the right side of the general pump equation, permitting lower peripheral speed; the smaller angle $\Delta_2$ at entrance will, for the same speed, decrease the whirl component, but since the improved efficiency will permit lower speed we will have a further lowering of the whirl component.

It is also apparent from Fig. 4 that for the same speed better diffusion occurs at the higher water velocities. A runner designed for dual use, where a certain amount of diffusion is necessary for best turbine operation, should therefore be laid for high relative velocities, which are best obtained by higher peripheral speed and small blade angle.

The cross-sectional relation alone of inflow and outflow area over a given length, or the rate of diffusion per foot length of flow line, is not a complete measure for expressing the diffusion characteristics of a runner. It is evident that a runner of narrow width with radial inflow and outflow, with a gradual curvature of center line of stream flow in one plane, at right angles to the axis of rotation, will permit a greater rate of diffusion at the same velocity than a runner of greater width, or more abrupt curvature of center line of stream flow and with a turning of this stream line in more than one plane.

The runner model, from which the test curves in Figs. 3, 4, and 5 were obtained, had all the last mentioned unfavorable characteristics, which explains the relatively low efficiencies and unduly large spread between speed of best turbine and best pump efficiency. Yet with some modifications, practically every type of turbine can be adapted for dual use, by designing runner passages, vane angles, guide vanes, and selecting peripheral speed, draft tubes, etc., with some consideration for suitability for pumping rather than exclusively for use as turbine.

As to peripheral speed, a study of test results in conjunction with the actual dimensions of the runners under test, indicated that pumping over the whole cross-sectional area of the water passages as well as improved diffusion is obtained, if peripheral speed at the smallest diameter exit edge is slightly greater than $$\sqrt{2g \cdot H},$$

or a minimum of 8.05 times square root of highest pumping head. It was also observed, though somewhat contrary to what might be expected, that the permissible rate of diffusion is greater at higher velocity and that to obtain best conditions over a given length of flow line, the diffusion head per unit length of flow line may be decreased approximately in proportion to the square root of the water velocities.

Figure 14:
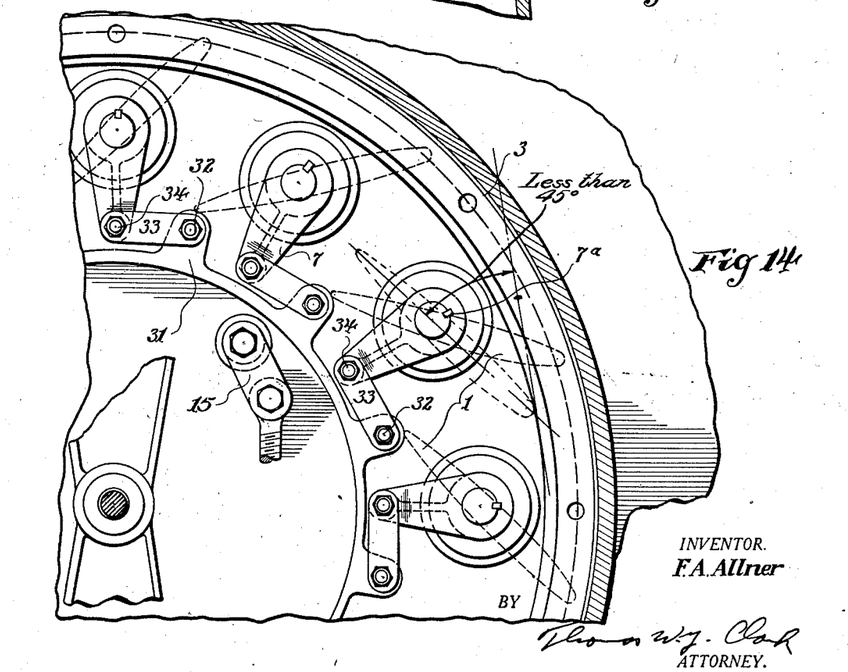
Fig. 14 is a plan view of a radial flow turbine with adjustable blades showing link connection between blade arm and adjusting spider.

Gradual diffusion is facilitated by a design of rotor blades in which the blade angles at each point of the outflow edge of the rotor blades to the tangents of circles drawn co-centrically with the axis of the rotor through the same points of the outflow edge, and measured in the plane formed by this tangent and the stream line at the same point of the outflow edge are less than 45 degrees as indicated in the pumping position of one blade of the radial flow turbine of Fig. 14. This plane formed by the tangent of a circle and stream line at the outflow edge of the rotor blades, in the case of axial flow turbines, lies parallel to the axis of the rotor, in the case of radial flow turbines at right angles to the axis of the rotor and in the case of diagonal flow turbines at angles intermediate between 0 and 90 degrees.

In the case of axial and diagonal flow turbines and also of those radial flow turbines, where there is an appreciable difference in diameter along the inflow edge and the rotor blades (when operating as turbines), the suitability for dual use is greatly improved if the tips of the guide vanes are brought as closely as practicable to the edge of the rotor blades and if the angles of the guide vanes are made smaller at the points opposite the smaller diameters of the rotor blades than at the points opposite the larger diameters. The guide vanes themselves may be placed either diagonally or radially.

Figure 10:
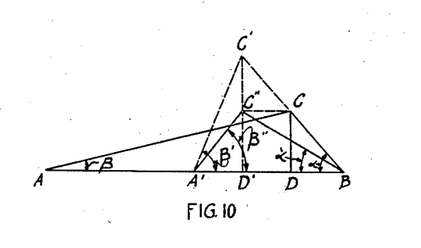
Fig. 10 is a velocity diagram showing determination of varying angle guide vanes.

The variation in the angles of the guide vane tips should be approximately in conformity with the angles $\alpha$ and $\alpha'$ of the velocity diagram shown in Fig. 10, in order to have a minimum of shock losses and whirl component and approximately the same head produced along the width of the rotor blade.

In Fig. 10, AB is the peripheral velocity of the maximum rotor blade diameter and A'B the peripheral velocity of the minimum diameter. For the guide vane angle $\alpha$ at the point of maximum diameter and the angle $\beta$ at the corresponding point of the runner blade, the velocity diagram ABC will close without shock loss and at a rate of radial outflow CD if under conditions of shock free entrance the pump equation $$\frac{H \cdot g}{e_p} = AB \times BD$$

is satisfied. If we also aim at shock free exit and shock free and whirl free entrance at the minimum diameter flow line, and without any change in the guide vane angle $\alpha$, the partly dotted velocity diagram A'BC' will prevail in which again the general pump equation must be satisfied by $$\frac{H \cdot g}{e_p} = A'B \times BD'.$$

This would require a relatively steep angle $\beta'$ at the runner blade and a relatively large rate of radial inflow C'D' which cannot be properly taken care of due to the restricted condition of flow passages at the smaller diameters. This latter condition will have a tendency to produce shock loss at exit and a throttling down of the rate of outflow to approximately the same value over the whole width of the blade. A reduction in the angle $\alpha$ of the guide vanes at the point of maximum diameter, to the value $\alpha'$, shown in the diagram of Fig. 10, at the point of minimum diameter, for which angle the full line velocity diagram A'BC'' is assumed to satisfy the pump equation $$\frac{H \cdot g}{e_p} = A'B \times BD',$$

will permit shockless exit, an angle $\beta''$ at the runner blade less steep than $\beta'$, and approximately the same rate, C''D', of radial outflow as at the point of maximum diameter.

As this invention is primarily applicable to water power plants, located serially on rivers with variable stream flow, the hours of use of the hydraulic motor as turbine will greatly preponderate over the hours of use as pump. Any reduction in efficiency and capacity of the hydraulic motor when used as a turbine below that obtainable at the speed of best turbine efficiency will entail a much greater economic loss than the same amount of reduction in efficiency and capacity when used as a pump below that obtainable at the speed of best pump efficiency.

The most frequent application of this invention will be concerned with those cases where the operating speed will be selected at or near the point of best turbine performance and in consequence thereof a reasonable reduction in pumping efficiency will be accepted. My experiments and the design developed therefrom were directed towards first determining the relationship of pump and turbine efficiencies for different types of now available hydraulic rotary machines because no research work covering that field had been done insofar as I was able to find in literature or through inquiries from the leading experts in this country and abroad and, second, toward establishing the fundamental theory and suitable designs of hydraulic dual use machines in combination with suitable electrical machines to make this invention practically applicable over a wide range of conditions.

Aside from these experimental and theoretical studies of present types and proposed new types of hydraulic machines, I also determined the most effective method of operating dual use machines in actual service, based on observations of laboratory and field tests conducted for that purpose, including actual pumping with large turbines up to 20,000 H. P.

As brought out in my copending patent, referred to, variations in head due to the combined effect of drawdown from the upper pond and accumulation of excess discharge in the lower pond will depend largely on the individual characteristics of the water power developments. Where pondage is relatively large in comparison to minimum natural inflow, these variations in head, expressed in percentage of normal head, will not be as great as in certain other cases where pondage is relatively small. Some types of dual use hydraulic machines, among those described below, will be better suited for large variations of head than some of the other types.

Other factors controlling the selection of dual use machine best suited to the conditions, refer to the relative preponderance of generating hours during high flow over pumping hours during low flow; to the unit value of high flow peak energy and low flow off-peak energy; to the amount of normal head which, when high, favors the lower specific speed type of Francis runner inherently better suited for efficient dual use but, when low, favors the diagonal or axial flow turbine; to the question of head variation during extreme high and low flow stages of the river, which, when large, favors the employment of turbines of the more expensive adjustable blade type for reasons other than consideration of dual use.

In most cases the selection of either fixed or adjustable rotor blade type of hydraulic machines, operating at the same speed as turbine and pump, will satisfactorily meet the requirements of best economic utilization of water power developments contemplated in my invention. In some special cases, however, where power is supplied at two frequencies or where the difference between maximum and minimum head is relatively large, operation of the dual use unit at different speeds will be practical and economical.

For example, if some of the generators supply single phase traction load at low power factor and at a frequency of, say, 25 cycles, the dual use machine can be connected to a generator capable of operating as motor at a frequency of 60 cycles and at a speed 20% greater than generator speed. The capacity of the electrical machine as a motor will then be approximately 70% to 100% greater than its capacity as a generator. In other cases, where the variation of head is large, the electrical machine can be designed for motor operation at double speed with an increase in capacity of approximately 100% over its capacity as a generator at half speed.

It is not possible to give in this disclosure a complete list of all combinations of different type dual use hydraulic machines in combination with single speed or two speed electrical machines, specifying the best suitability of every combination for certain hydraulic and electrical conditions. However, I have made an investigation of the characteristic behavior of the different types of turbines, suitably designed for dual use, within the range of their practical adaptability for single speed or two speed operation and am giving in tabulated form the approximate results to be expected as to efficiency and capacity under those conditions. The tabulation below will make it possible for anyone familiar with the art of hydro-electric engineering and power system planning, who follows the disclosures of this invention, to select the general type of equipment as a preliminary step for the final design of hydro-electric developments to which my invention is applicable.

I. Turbines with fixed blades

|  | (a) Francis | | (b) Diagonal flow | | (c) Axial flow | |
|---|---|---|---|---|---|---|
| Pump performance: | | | | | | |
| Speed in percent of turbine speed | 100 | 120 | 100 | 120 | 100 | 120 |
| Power in percent of turbine power | 115 | 175 | 115 | 175 | 115 | 175 |
| Approx. efficiency | 72.5% | 80.25% | 76.5% | 80.75% | 73% | 80.75% |

II. Turbines with adjustable blades

|  | (a) Francis | | | (b) Diagonal flow | | | (c) Axial flow | | |
|---|---|---|---|---|---|---|---|---|---|
| Pump performance: | | | | | | | | | |
| Speed in percent of turbine speed | 100 | 120 | 200 | 100 | 120 | 200 | 100 | 120 | 200 |
| Power in percent of turbine power | 115 | 175 | 200 | 115 | 175 | 200 | 105 | 175 | 200 |
| Approx. efficiency | 83% | 85% | 90% | 84% | 85% | 60% | 84% | 85% | 60% |

The above data on expected pump performance is all based on a best turbine efficiency of 92%, power and speed at best turbine efficiency being taken as 100%. Allowance has been made for reversed slope in tailrace, intake and setting losses, by assuming a net pumping head 10% greater than net turbine head. As brought out previously, turbine capacity may be appreciably increased at slight sacrifice of efficiency, if a normal operating speed greater than 100% (speed of best turbine efficiency) is selected. This higher speed would materially increase pumping efficiency for all cases of single speed operation. Conversely, however, in the case of double speed operation, a slight lowering of turbine speed will materially increase pumping efficiency.

In all these machines the peripheral speed of the smallest diameter exit edge of the runner blades when operating as a pump, must be slightly greater than 8.05 times the square root of the highest pumping head. The blade angles to the tangent at any point of exit should not be greater than approximately 45°, and at the largest diameter not more than 35°. This arrangement of angles will greatly reduce the percent diffusion as compared with the customary larger angles and permits operation as turbine at a speed higher than that of best efficiency with considerable gain in capacity and at only small reduction of efficiency. A gradual change in the rate of diffusion should be maintained but as the rate of diffusion per foot of length can be greater at higher velocities than at lower velocities, without danger of breaking up stream lines, it is permissible and desirable to so proportion the water passages between vanes that the difference between the square roots of the water velocities measured in any two cross-sections at right angles to the flow line, one foot apart, shall be approximately the same over the whole length of the channel.

As these small blade angles have the further tendency to increase relative speed in the vane passages and also require greater length of blades measured in the direction of flow, a somewhat greater amount of friction losses but a better guiding of stream line will be obtained. To counteract the effect of greater friction due to increased relative velocity and longer blades, it is advisable to decrease the number of blades as compared with the number that is customary in the same type of turbine designed only for single use, and to omit the outside rim of the rotor wherever practicable.

Figures 15, 16:
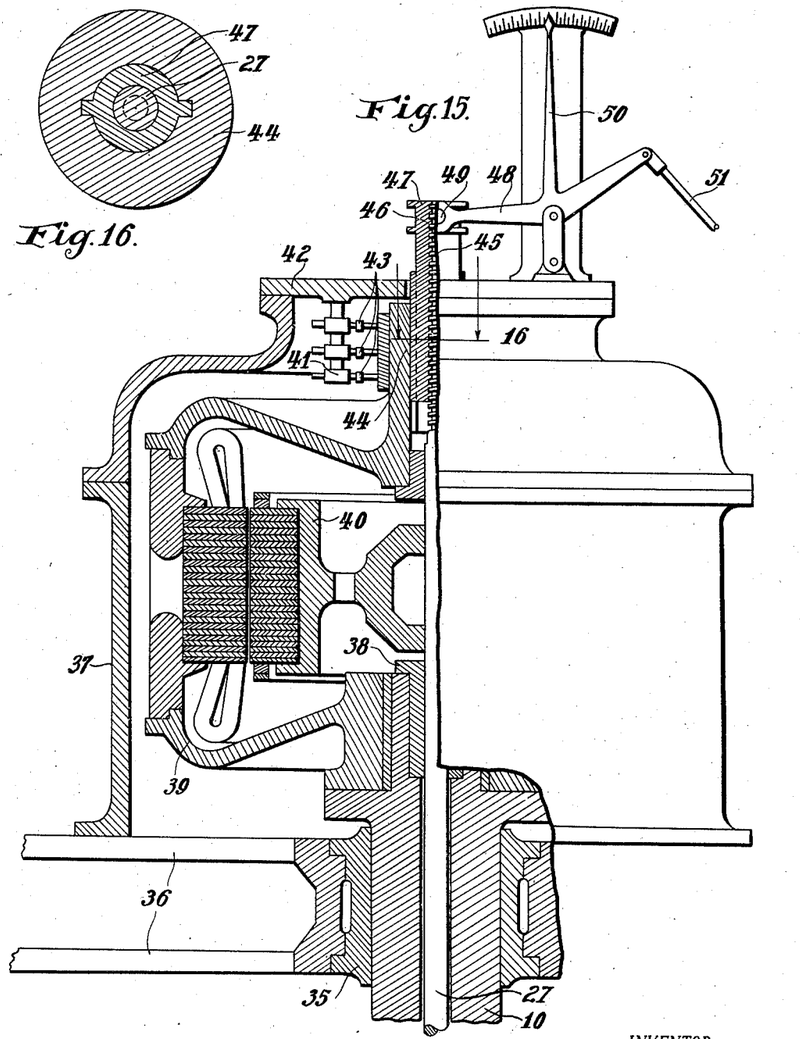
Fig. 15 is a partial cross-sectional elevation of the upper portion of the main turbine shaft with control motor and blade position indicator.
Fig. 16 is an enlarged sectional plan view on line 16—16 of Fig. 15.

In Figs. 11, 12, 13 and 14, I show the details of a radial flow turbine with adjustable blades and in Figs. 15 and 16 the arrangement of adjusting mechanism at the end of the hollow turbine shaft.

Figure 11:
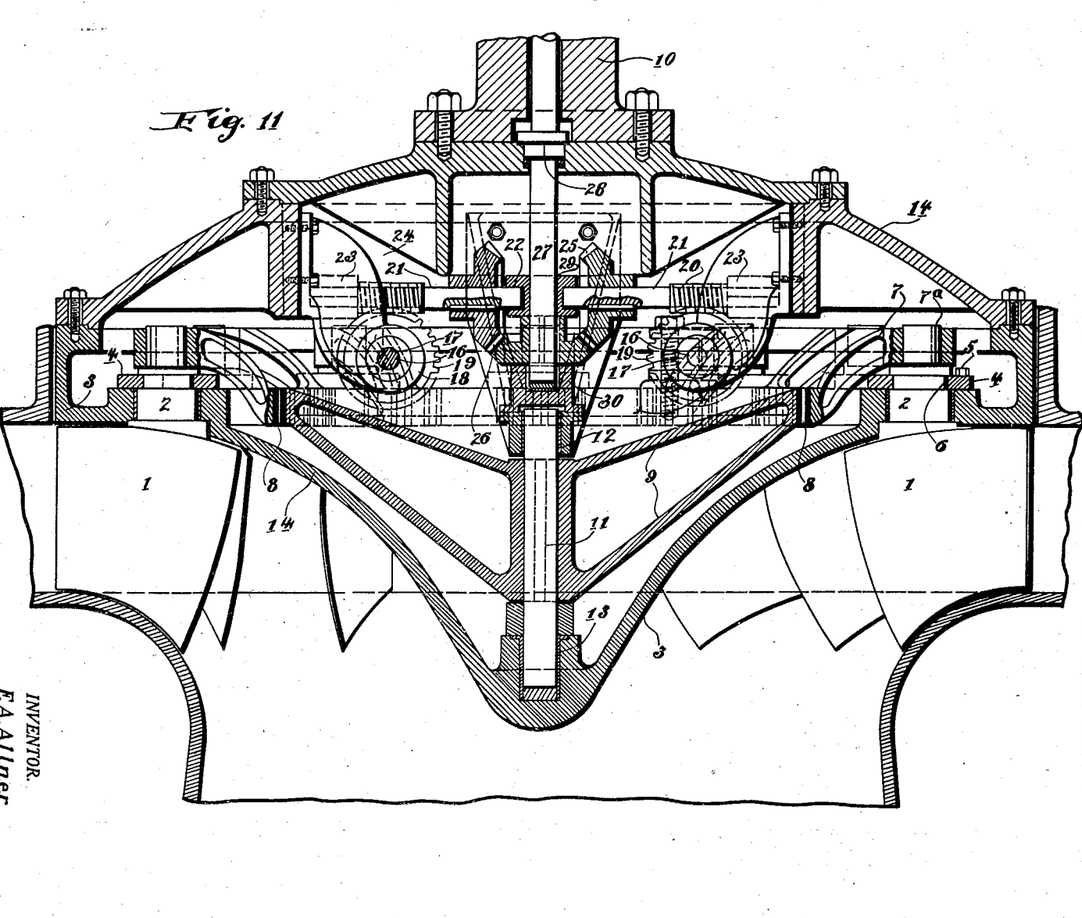
Fig. 11 is a cross-sectional elevation of a radial flow turbine with adjustable blades, suitable for operation as turbine or as pump.
Figure 12:
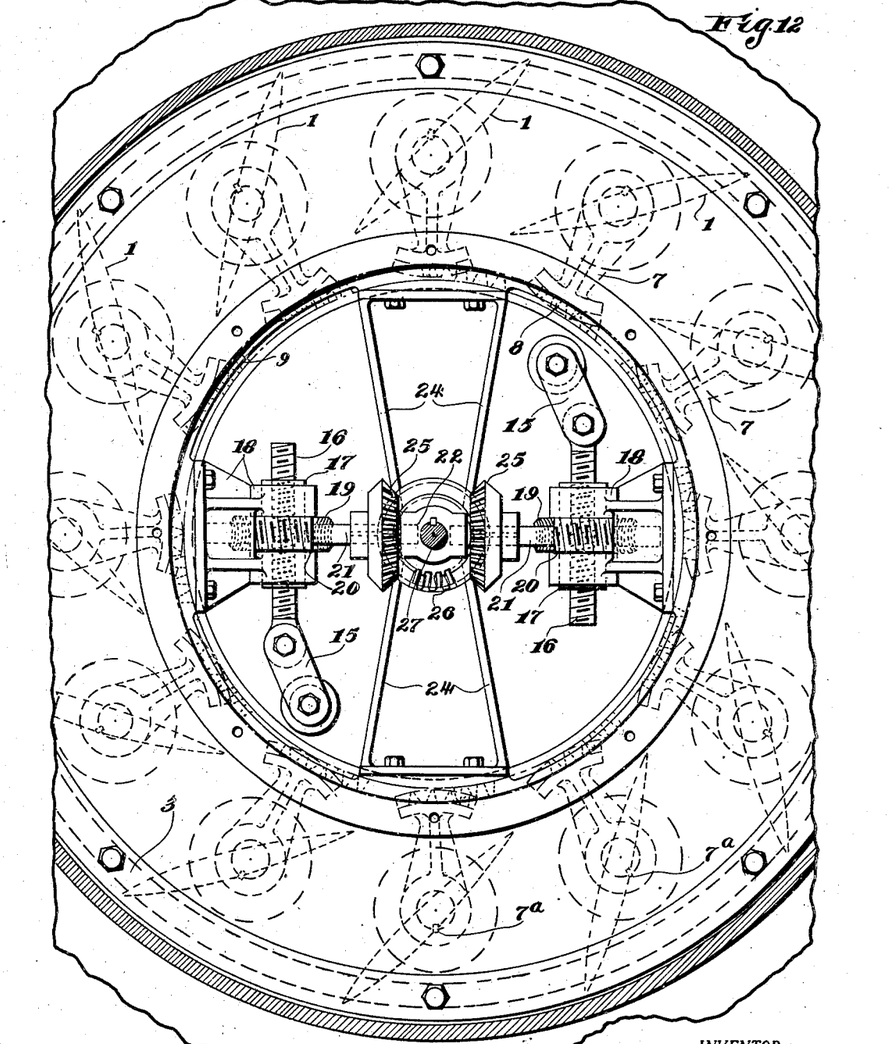
Fig. 12 is a plan view of the rotor of a radial flow turbine, with the cover plate of the hollow hub removed.

Each rotor blade 1 is integral with a pivot 2 fitting into the inside rim of the rotor 3 and retained therein in such a manner that it may rotate around the axis of the pivot but may not move axially. This is accomplished by a split collar ring 4, fastened by bolts 5 to the rim of the rotor, the inside portion of the ring fitting into a recess 6 of pivot 2. Lever arms 7 are fastened by keys 7a to the free end of pivot 2, which arms have gear shaped segments 8 that engage with spoked spur gear 9 mounted co-axially with the main shaft 10 of the rotor on the short shaft 11, supported in bearings 12 and 13, fastened to the hollow hub 14 of the rotor.

For the purpose of taking up all lost motion in the adjusting mechanism and of also preventing excessive overspeed in the event of breakage in any part of the mechanism, the pivots 2 of rotor blades 1 are slightly off center in such a manner that under all conditions of turbine or pump operation there will be a twisting movement, produced by the water pressure, tending to move the blades into closed position.

To the spur gear 9 are attached two plate links 15 connected to screw stems 16, fitting into nuts 17, held rigidly in place relatively to the rotor shaft by bearings 18, attached to the hollow hub 14 of the rotor 3. The outsides of the nuts are shaped as worm wheels 19, driven by worms 20. The worms 20 are mounted on radially located worm shafts 21, the outer ends of which are supported by inner axial bearings 22 and two-way thrust bearings 23, both rigidly connected to the hollow hub 14, the inner axial bearings being supported by brackets 24.

Bevel gears 25, mounted on the inner ends of the worm shafts, engage with bevel gear 26 attached to adjusting shaft 27, located co-axially with and in the hollow main shaft 10 of the rotor. Adjusting shaft 27 is supported by sleeve bearings 28 and 29, Fig. 14, and by thrust bearing 30.

Figure 13:
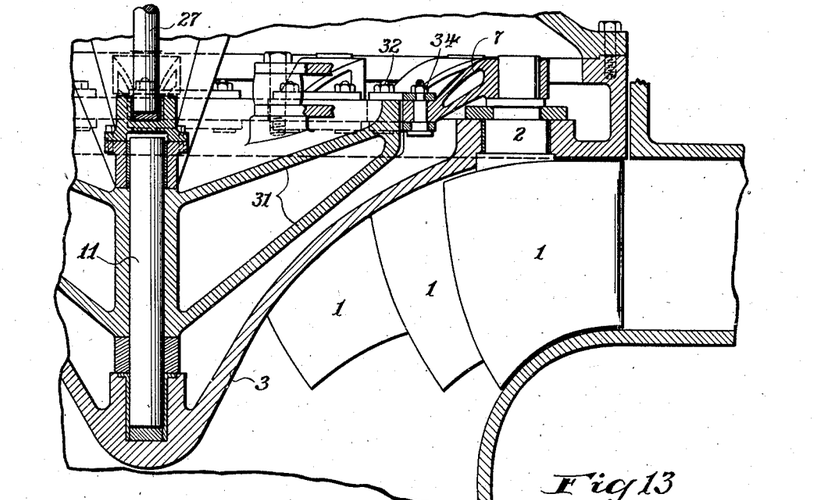
Fig. 13 is a cross-sectional elevation of a radial flow turbine with adjustable blades showing link connection between blade arm and adjusting spider.

Instead of the spur gear 9 engaging the gear shaped segments 8 of lever arms 7, a spider arm 31, shown on Figs. 13 and 14, can be employed that will engage through suitable bolts 32 and links 33 with bolts 34 fastened to the lever arms of each rotor blade.

In Figs. 15 and 16 I have shown the control motor, or runner blade angularity adjuster and indicator; hollow shaft 10 carrying the runner hub 14 rotates in bearing 35 mounted by supports 36 to the top rim of the electric machine 37. Blade adjusting shaft 27 rotates freely in hollow shaft 10 on bearings 38. Keyed to, and rotating with, hollow shaft 10, is a stator 39 of a motor. Shaft 27 has keyed to and rotating with it, the rotor 40 of the motor, so that upon energizing of the motor, the hollow shaft 10 and the adjusting shaft 27 will rotate relatively the one to the other and thereby adjust the angularity of the runner blades. Brushes 41 on casing 42 contact with slip rings 43 on the upper stator hub 44. Threads 45 are on the upper end of adjusting shaft 27, and with these threads, mesh corresponding threads 46 on sleeve 47. This sleeve 47 is splined to the upper hub member 44 of stator 39 and rotates with it. Consequently, upon relative movement of shafts 10 and 27, axial movement is imparted to sleeve 47, and this movement is imparted to lever 48 through the collar ring 49 running in a collar on sleeve 47. Indicator hand 50, therefore, shows the blade angularity. Lever 48 may be connected by rod 51 to a standard governor not shown, customarily used on hydraulic prime movers.

In Figs. 17, 18, 19 and 20, I have shown the arrangement of blades and hollow hub for a diagonal flow hydraulic machine. Each rotor blade 1 is integral with a pivot 2 fitting into the inside rim of the rotor 3 and retained therein in such a manner that it may rotate around the axis of the pivot, but may not move axially. This is accomplished by a split collar ring 4, fastened by bolts 5 to the rim of the rotor, the inside portion of the ring fitting into a recess of pivot 2, the same as in Fig. 11. Lever arms 7 are fastened by keys 7a to the free end of pivot 2, which arms have a gear shaped segment 8 that engages with a bevel gear 9 mounted coaxially with the main shaft 10 of the rotor on the short shaft 11, supported in bearings 12 and 13, fastened to the hollow hub 14 of the rotor.

Figure 17:
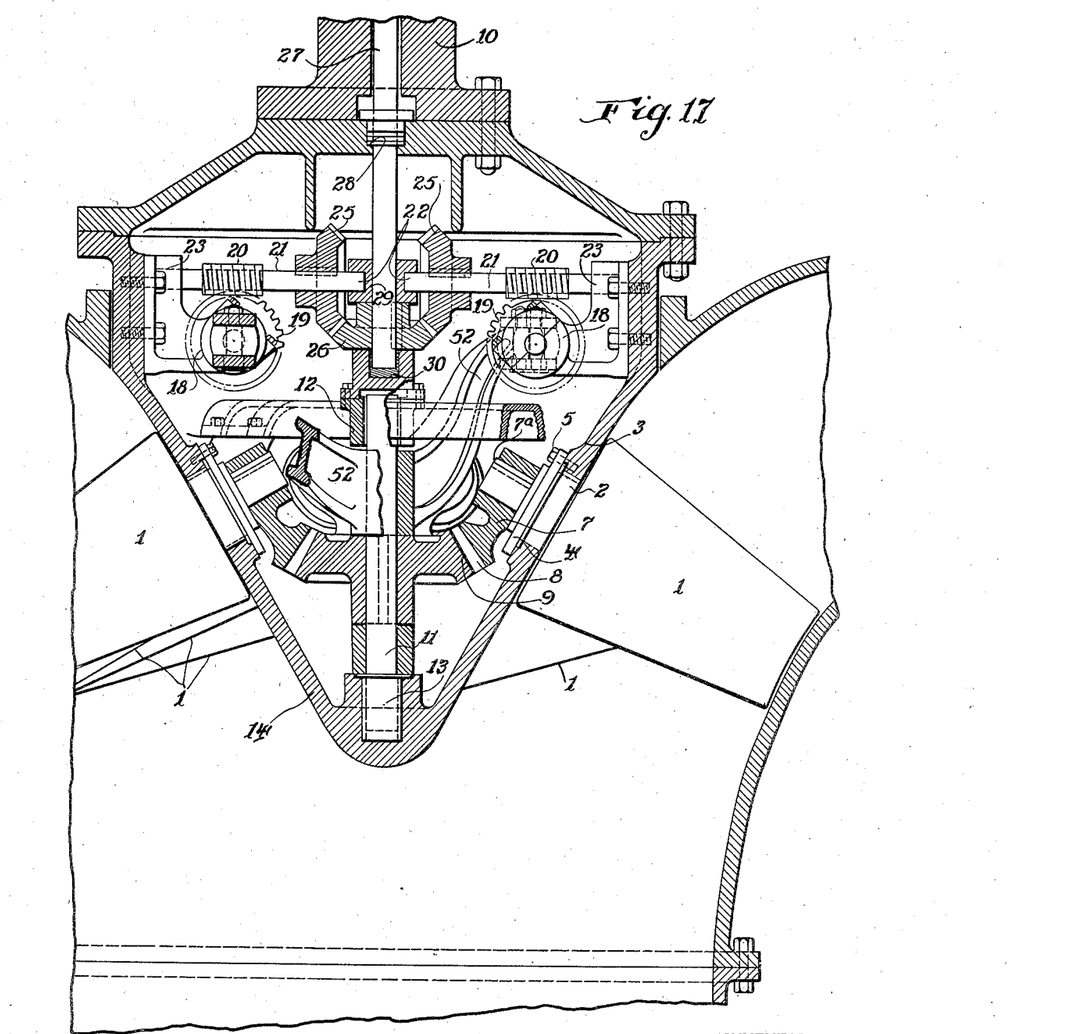
Fig. 17 is a cross-sectional elevation of a diagonal flow turbine with adjustable blades suitable for operation as turbine or as pump.
Figure 18:
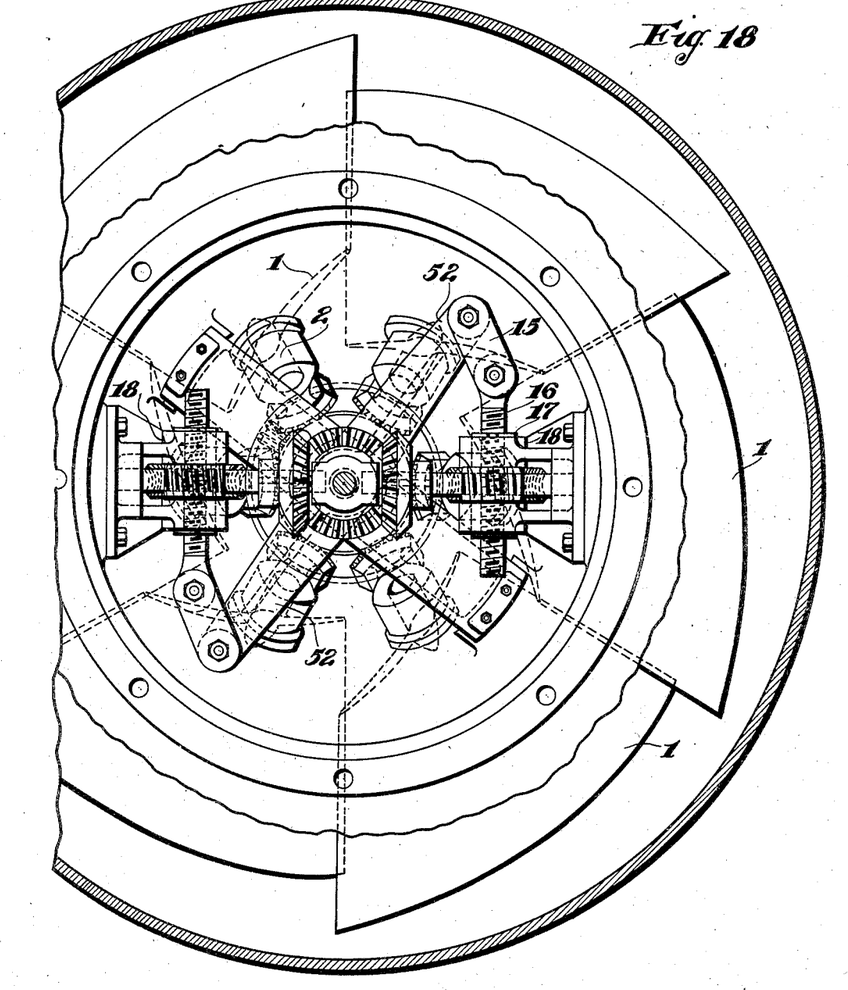
Fig. 18 is a plan view of the rotor of a diagonal flow turbine, with the cover plate of the hollow hub removed.

To this short shaft 11 are attached two lever arms 52, the ends of which are connected by links 15 to screw stems 16, fitting into nuts 17, held rigidly in place relatively to the rotor shaft by bearings 18, attached to the hollow hub 14 of the rotor. The outsides of the nuts are shaped as worm wheels 19, driven by worms 20. The worms 20 are mounted on radially located worm shafts 21, the ends of which are supported by axial bearings 22 and combined axial and two-way thrust bearings 23 both rigidly connected to the hollow hub 14.

Bevel gears 25, mounted on the inner ends of the worm shaft, engage with another bevel gear 26 attached to adjusting shaft 27, located co-axially with and in the hollow main shaft 10 of the rotor. Adjusting shaft 27 is supported by sleeve bearings 28 and 29 and by thrust bearing 30.

Figure 19:
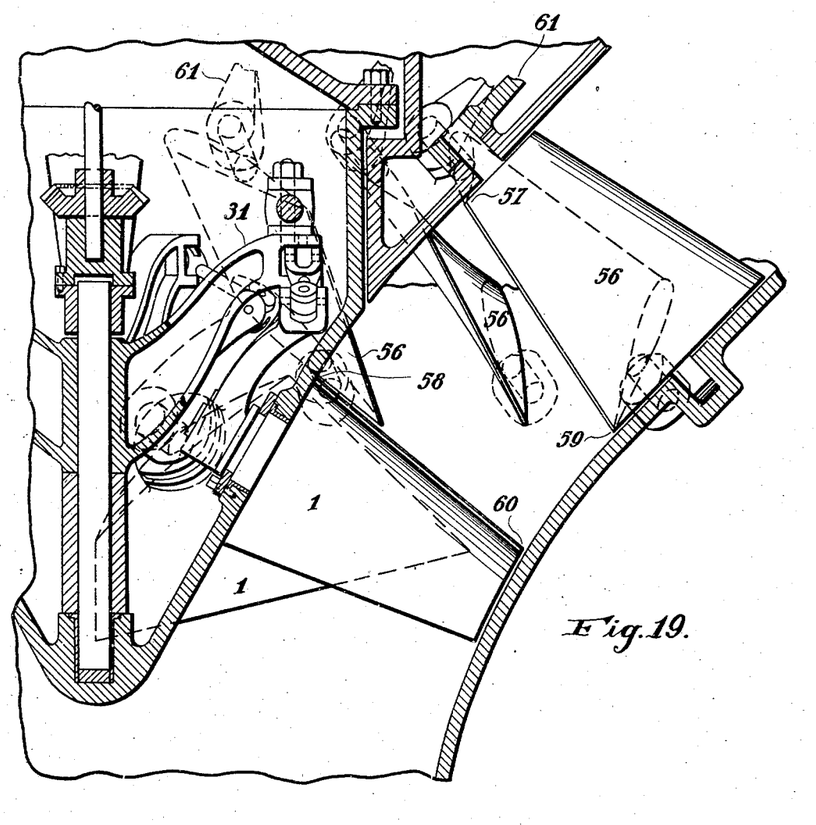
Fig. 19 is a cross-sectional elevation of a diagonal flow turbine with adjustable blades showing link connection between blade arm and adjusting spider and showing also varying angle guide vanes.
Figure 20:
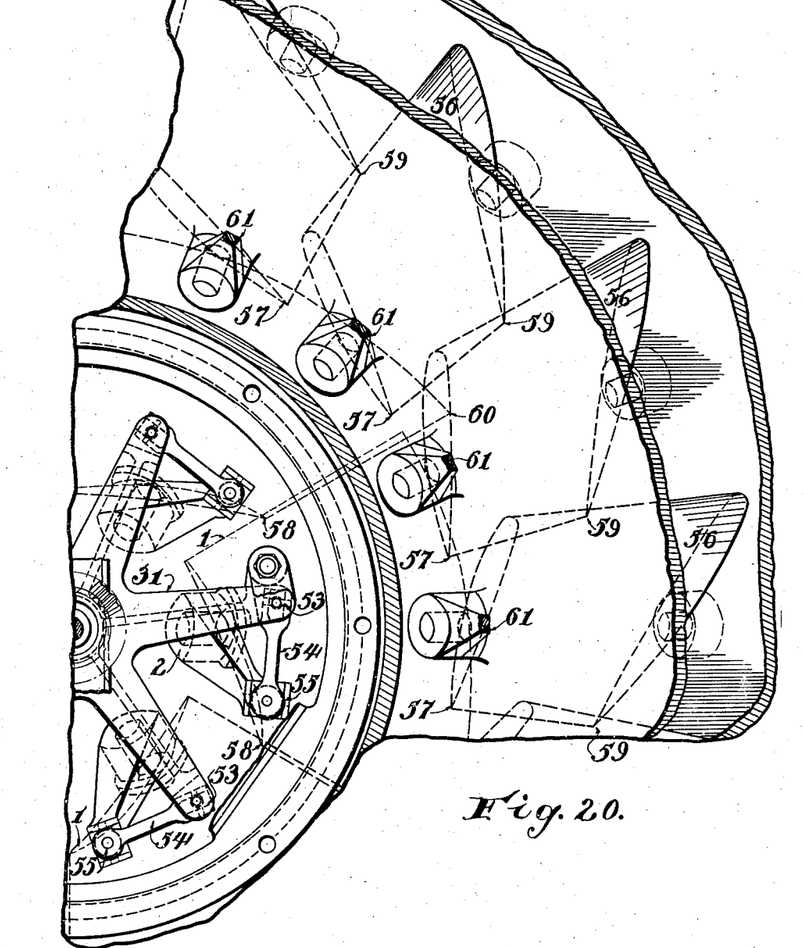
Fig. 20 is a plan view of a diagonal flow turbine with adjustable blades showing link connection between blade arm and adjusting spider and showing also varying angle guide vanes.

Instead of bevel gear 9 engaging the gear shaped segments 8 of lever arms 7, a spider arm 31, shown in Figs. 19 and 20, can be employed that will engage through universal joints 53 and links 54 with universal joints 55 of the lever arms 7 of each rotor blade.

The same angularity adjuster at the end of the hollow shaft, as shown in Figs. 15 and 16, can also be employed in combination with axial or diagonal flow hydraulic motors.

In Figs. 19 and 20 I have also shown an arrangement of varying angle guide vanes 56, which have a smaller angle to the tangent at the points 57, corresponding to the smaller diameters 58 of the rotor blades 1, than at the points 59, corresponding to the larger diameters 60 of the rotor blades 1. This type of guide vanes is suitable for diagonal flow turbines with adjustable blades and with fixed blades. They can be used in diagonal position, as shown in Figs. 19 and 20, or in radial position. The lever arms 61 of these varying angle guide vanes 56 are connected by suitable means, not shown, to the gate operating mechanism, customarily employed with turbines of this type.

It will be appreciated that the various constructions and arrangements described above have been given by way of example only and that modifications may be made without departing from the scope of the invention.

What I claim as my invention and desire to secure by Letters Patent is:

1. A hydraulic rotary machine of a modified Francis turbine type with inside rim mounted upon a main shaft, and having substantially radial inflow and slightly diagonal outflow, the rotor blades being mounted movably to the inside rim of the rotor, means to adjust the angular position of the blades while the machine is in operation, said means including suitable mechanical connection of lever arms attached to the pivot of each blade, to a movable shaft, located within the hub of the rotor co-axially with the main shaft and rotatable relatively to the rotor by one or more screw stems, the nuts of which have an outside rim shaped as worm gear, said worm gear being engaged by a worm the shaft of which extends radially to the axis of the rotor and is driven from a shaft extending co-axially through the hollow shaft of the main rotor and connected at the top of the rotor shaft to an electric motor, the stator of which is attached rigidly to and rotates with the main shaft, said motor having slip rings for supplying electric current to rotate the armature of said motor relatively to the main shaft in either direction.

2. A hydraulic rotary machine of the diagonal flow type, having the rotor blades movably mounted on the rotor, means to adjust the angular position of the rotor blades while the machine is in operation, comprising an adjusting connection from the rotor blades to one or more screw stems, having nuts which have an outside rim shaped as worm gear, said worm gear being engaged by a worm the shaft of which extends radially to the axis of the rotor and is driven from a movable shaft extending co-axially through the hollow shaft of the main rotor and is connected at the top of the rotor shaft to an electric motor the stator of which is attached rigidly to and rotates with the main shaft, said motor having slip rings for supplying electric current to rotate the armature of said motor relatively to the main shaft in either direction.

3. Means to adjust the angular position of the blades of a rotary hydraulic machine comprising a hollow shaft carrying the hub supporting the runner blades, a shaft within said hollow shaft, a torque increasing means in said hub to adjust the angular position of said blades and rotating with said hollow shaft, and an electric motor the stator of which is rigidly attached concentrically to the hollow main shaft and the rotor of which imparts movement to and is integral with the inner shaft, thereby adjusting the angular position of the runner blades in such a manner that each relative position of said inner shaft in respect to the hollow shaft corresponds to a definite angular position of the runner blades.

4. A blade adjusting mechanism for hydraulic rotary machines of the adjustable blade type, comprising a shaft located in the hollow hub of the rotor co-axially with the rotor and engaging with lever arms connected to each rotor blade, said shaft being movable relatively to the rotor and having mounted thereon the armature of an electric motor the stator of which is attached rigidly to and rotates with the main shaft, said motor having slip rings for supplying electric current to rotate the armature of said motor relatively to the main shaft in either direction, the rotor shaft of said motor being extended beyond the main shaft and engaging a sleeve slidably mounted in co-axial direction in such a manner that the axial movement of said sleeve is substantially proportional to the angular position of the adjustable blades of the hydraulic rotary machine, said axial movement being transmitted by lever mechanism to a stationary blade position indicator.

5. A hydraulic rotary machine comprising a rotor, and rotor blades pivotally attached to the rotor in such a manner that under all conditions of operation there will be an unbalance of forces tending to turn each blade around its pivot in the direction of reducing the water passages between the blades, and with means to adjust the angular position of the rotor blades, comprising an adjusting connection from the rotor blades to one or more screw stems, the nuts of which have an outside rim shaped as worm gear, said worm gear being engaged by a worm the shaft of which extends radially to the axis of the rotor and is driven from a shaft extending co-axially through the hollow shaft of the main rotor and having mounted thereon the armature of an electric motor the stator of which is attached rigidly to and rotates with the main shaft, said motor having slip rings for supplying electric current to rotate the armature of said motor relatively to the main shaft in either direction.

6. A dual use hydraulic rotary machine located between two water levels and consisting of a rotating part or runner with blades thereon, having a peripheral velocity when operating as a pump at the smallest diameter outflow edge, equal in feet per second to at least 8.05 times the square root of the highest pumping head measured in feet, the blade angles at the outflow edge of the rotor blades to the tangents of circles drawn through the outflow edge co-centrically with the rotor, and measured in the plane formed by this tangent of circle and the stream line at the same point of the outflow edge, being 45 degrees or less.

7. A dual use hydraulic rotary machine located between two water levels and consisting of a rotating part or runner with blades thereon and having a peripheral velocity when operating as a pump at the smallest diameter outflow edge, equal in feet per second to at least 8.05 times the square root of the highest pumping head measured in feet, the blade angles at the outflow edge of the rotor blades to the tangents of circles drawn through the outflow edge co-centrically with the rotor, and measured in the plane formed by this tangent of circle and the stream line at the same point of the outflow edge, being 45 degrees or less, the areas between blades being so proportioned that the velocity of the water filling the whole of the channels between the blades is decreased at a gradually decreasing rate over the length of said channels in such a manner that the difference between the square roots of the water velocities measured in any two equidistant cross-sections of said channels at right angles to the flow line is substantially the same over the whole length of said channels.

8. A dual use hydraulic rotary machine located between two water levels and consisting of a rotating part or runner with blades thereon and having a peripheral velocity when operating as a pump at the smallest diameter outflow edge, equal in feet per second to at least 8.05 times the square root of the highest pumping head measured in feet, the blade angles at the outflow edge of the rotor blades to the tangents of circles drawn through the outflow edge co-centrically with the rotor, and measured in the plane formed by this tangent of circle and the stream line at the same point of the outflow edge, being 45 degrees or less, in combination with a stationary part or distributor containing guide vanes rotatably adjustable on pivots, said guide vanes being warped, having larger angles to the tangents of the periphery at the points corresponding to the larger diameter of the runner blades than at the points corresponding to the smaller diameter of the runner blades.

9. A dual use hydraulic rotary machine located between two water levels and consisting of a rotating part or runner with blades thereon and having a peripheral velocity when operating as a pump at the smallest diameter outflow edge, equal in feet per second to at least 8.05 times the square root of the highest pumping head measured in feet, the blade angles at the outflow edge of the rotor blades to the tangents of circles drawn through the outflow edge co-centrically with the rotor, and measured in the plane formed by this tangent of circle and the stream line at the same point of the outflow edge, being 45 degrees or less, the areas between blades being so proportioned that the velocity of the water filling the whole of the channels between the blades is decreased at a gradually decreasing rate over the length of said channels in such a manner that the difference between the square roots of the water velocities measured in any two equidistant cross-sections of said channels at right angles to the flow line is substantially the same over the whole length of said channels, in combination with a stationary part or distributor containing guide vanes rotatably adjustable on pivots, said guide vanes being warped, having larger angles to the tangents of the periphery at the points corresponding to the larger diameter of the runner blades than at the points corresponding to the smaller diameter of the runner blades.

10. A dual use hydraulic rotary machine located between two water levels and consisting of a rotating part or runner having blades movably mounted on the runner, a peripheral velocity when operating as a pump at the smallest diameter outflow edge, equal in feet per second to at least 8.05 times the square root of the highest pumping head measured in feet, the blade angles at the outflow edge of the rotor blades to the tangents of circles drawn through the outflow edge co-centrically with the rotor, and measured in the plane formed by this tangent of circle and the stream line at the same point of the outflow edge, being 45 degrees or less.

11. A dual use hydraulic rotary machine located between two water levels and consisting of a rotating part or runner having blades movably mounted on the runner, a peripheral velocity when operating as a pump at the smallest diameter outflow edge, equal in feet per second to at least 8.05 times the square root of the highest pumping head measured in feet, the blade angles at the outflow edge of the rotor blades to the tangents of circles drawn through the outflow edge co-centrically with the rotor, and measured in the plane formed by this tangent of circle and the stream line at the same point of the outflow edge, being 45 degrees or less, the areas between blades being so proportioned that the velocity of the water filling the whole of the channels between the blades is decreased at a gradually decreasing rate over the length of said channels in such a manner that the difference between the square roots of the water velocities measured in any two equidistant cross-sections of said channels at right angles to the flow line is substantially the same over the whole length of said channels.

12. A hydraulic rotary machine consisting of a rotating part or runner with inside rim mounted upon a hollow shaft, the rotor blades being mounted movably on the inside rim of the rotor, means to adjust the angular position of the rotor blades while the machine is in operation, said means including a torque reducing connection located within the hub of the rotor from the rotor blades to a movable shaft within the hollow shaft and rotatable relatively to the rotor, said shaft connected integrally to the rotor of an electric motor the stator of which is attached rigidly and concentrically to and rotates with the hollow shaft, each relative position of said inner shaft in respect to the hollow shaft corresponding to a definite angular position of the runner blades.

13. Means to adjust the angular position of the runner blades of a rotary hydraulic machine comprising a hollow shaft carrying the hub supporting the runner blades, an adjusting connection from the runner blades to one or more screw stems, having nuts which have an outside rim shaped as worm gear, said worm gear being engaged by a worm the shaft of which extends radially to the axis of the rotor and is driven by a movable shaft extending co-axially through the hollow shaft of the main rotor, and means to adjust said movable shaft relatively to said hollow shaft.

14. A distributor casing for guiding the water flow from or to hydraulic rotary machines the outside tips of the runner blades of which have a different distance from the rotor axis, which casing has movably mounted guide vanes for controlling the direction of flow from or to the rotor, said guide vanes being warped, having larger angles to the tangents of the periphery at the points opposite to or corresponding to the larger diameter of the runner blades than at the points opposite to or corresponding to the smaller diameter of the runner blades.

FREDERICK A. ALLNER.